US012720653B2

(12) United States Patent
Kim et al.

(10) Patent No.: US 12,720,653 B2
(45) Date of Patent: Aug. 25, 2026

(54) LIGHT-EMITTING DRIVING DEVICE AND A BACKLIGHT APPARATUS

(71) Applicant: LX SEMICON CO., LTD., Daejeon (KR)

(72) Inventors: Sang Suk Kim, Daejeon (KR); Jang Su Kim, Daejeon (KR); Ji Hwan Kim, Daejeon (KR); Jin Ho Choi, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 151 days.

(21) Appl. No.: 18/428,662

(22) Filed: Jan. 31, 2024

(65) Prior Publication Data

US 2024/0260153 A1 Aug. 1, 2024

(30) Foreign Application Priority Data

Feb. 1, 2023 (KR) ........................ 10-2023-0013825
Jan. 4, 2024 (KR) ........................ 10-2024-0001299

(51) Int. Cl.
*H05B 45/10* (2020.01)
*H05B 45/325* (2020.01)

(52) U.S. Cl.
CPC ........... *H05B 45/325* (2020.01); *H05B 45/10* (2020.01)

(58) Field of Classification Search
CPC ...... H05B 45/10; H05B 45/30; H05B 45/325; H05B 47/10
See application file for complete search history.

(56) References Cited

U.S. PATENT DOCUMENTS

2006/0022916 A1* 2/2006 Aiello .................. H05B 45/325 345/82
2013/0278145 A1* 10/2013 Lin .................... H05B 45/3725 315/122
2021/0160978 A1* 5/2021 Yu .......................... H05B 45/46
2022/0061135 A1* 2/2022 Gu ......................... H05B 45/14

OTHER PUBLICATIONS

Extended European Search Report dated May 28, 2024 issued for the European Patent Application No. 24155298.3, 10 pages.

* cited by examiner

*Primary Examiner* — Jimmy T Vu
(74) *Attorney, Agent, or Firm* — ROTHWELL, FIGG, ERNST & MANBECK, P.C.

(57) ABSTRACT

The light-emitting driving device can include a driving current generation circuit, a sensing circuit, a PWM signal generation circuit, and a controller. The driving current generation circuit can be connected to a channel terminal of a light-emitting string including a plurality of semiconductor light-emitting elements to generate a driving current supplied to the channel terminal. The sensing circuit is connected to the channel terminal to sense a voltage of the channel terminal. The PWM signal generation circuit can generate a PWM signal that controls the supply of driving current. The controller is connected to the sensing circuit to control at least one or more of the intensity of the driving current and the duty ratio of the PWM signal based on the sensed voltage of the channel terminal.

18 Claims, 7 Drawing Sheets

(VCH>REFH)

(VCH>REFH)

(VCH>REFH)

(VCH<REFH)

LIGHT-EMITTING DRIVING DEVICE AND A BACKLIGHT APPARATUS

CROSS REFERENCE TO RELATED APPLICATION(S)

This application claims the benefits of Korean Patent Application No. 10-2023-0013825, filed on Feb. 1, 2023, and Korean Patent Application No. 10-2024-0001299, filed on Jan. 4, 2024, the disclosures of which are herein incorporated by reference in their entirety.

BACKGROUND OF THE DISCLOSURE

Field

The embodiment relates to a light-emitting driving device and a backlight apparatus.

Discussion of the Related Art

A semiconductor light-emitting element that emit light by recombination of holes and electrons are applied to various fields, such as a backlight apparatus and a display panel. For example, a backlight device or a display device includes a plurality of light-emitting strings in each of which a plurality of semiconductor light-emitting elements is connected. The plurality of light emitting strings are provided in a backlight device or a display device. Since the threshold voltage of each of the plurality of semiconductor light-emitting elements included in each of the plurality of light-emitting strings is not the same, a forward voltage for emitting light from the plurality of semiconductor light-emitting elements in each of the plurality of light-emitting strings is different. Accordingly, due to differences in the forward voltage of each of the plurality of light-emitting strings, the forward voltage can be distributed in various ways.

Meanwhile, one side of each of the plurality of light-emitting strings is connected to a light-emitting driving device as a channel terminal. The light-emitting driving device supplies driving current to the channel terminal to emit light from a plurality of semiconductor light-emitting elements in the corresponding light-emitting string. Since the forward voltage is distributed in various ways for each of the plurality of light-emitting strings, the voltage at the channel terminal, that is, the headroom voltage, can also be distributed in various ways.

Among the plurality of light-emitting strings, the headroom voltages formed at the channel terminals of some light-emitting strings are higher than the maximum value of the distribution deviation range in the forward voltage. In this way, there is a problem in that the light-emitting driving device generates heat due to a headroom voltage higher than the maximum value of the distribution deviation range in the forward voltage, and various circuit characteristics within the light-emitting driving device are changed.

Therefore, there is an urgent need to develop a technology that reduce the headroom voltages distributed in various ways for a plurality of light-emitting strings and keeps them constant.

SUMMARY OF THE DISCLOSURE

An object of the embodiment is to solve the foregoing and other problems.

Another object of the embodiment is to provide a light-emitting driving device and a backlight apparatus that can reduce heat generation.

Another object of the embodiment is to provide a light-emitting driving device and a backlight apparatus that can increase reliability by maintaining a constant headroom voltage.

Another object of the embodiment is to provide a light-emitting driving device and a backlight apparatus that can reduce power consumption.

The technical problems of the embodiments are not limited to those described in this item and include those that can be understood through the description of the invention.

According to one aspect of the embodiment to achieve the above or other objects, a light-emitting driving device, comprising: a driving current generation circuit configured to be connected to a channel terminal of a light-emitting string comprising a plurality of semiconductor light-emitting elements to generate a driving current supplied to the channel terminal; a sensing circuit configured to be connected to the channel terminal and configured to sense a voltage of the channel terminal; a PWM signal generation circuit configured to generate a PWM signal that controls supply of the driving current; and a controller configured to be connected to the sensing circuit and configured to control at least one or more of an intensity of the driving current and a duty ratio of the PWM signal based on the sensed voltage of the channel terminal.

When the sensed voltage of the channel terminal exceeds a reference voltage, the controller can control the driving current generation circuit to increase the intensity of the driving current.

When the sensed voltage of the channel terminal exceeds the reference voltage, the controller can control the PWM signal generation circuit to reduce the duty ratio of the PWM signal.

When the sensed voltage of the channel terminal is less than or equal to the reference voltage, the controller can control at least one or more of the driving current generation circuit and the PWM signal generation circuit to block supply of the driving current.

The PWM signal can be a pulse signal that periodically has a high level and a low level, and the sensing circuit can sense the voltage of the channel terminal during a high-level section.

The controller is configured to supply or block the driving current by controlling the driving current generation circuit to be synchronized to the high level and the low level.

According to another aspect of the embodiment to achieve the above or other objects, a light-emitting driving device, comprising: a driving current generation circuit configured to be connected to a channel terminal of a light-emitting string comprising a plurality of semiconductor light-emitting elements to generate a driving current supplied to the channel terminal; a first switching element between the channel terminal and the driving current generation circuit; a sensing circuit configured to be connected to the channel terminal and configured to sense a voltage of the channel terminal; a second switching element between the channel terminal and the sensing circuit; a PWM signal generation circuit configured to generate a PWM signal that controls on and off of the first switching element and the second switching element; and a controller configured to be connected to the sensing circuit and configured to control at least one or more of an intensity of the driving current and a duty ratio of the PWM signal based on the sensed voltage of the channel terminal.

The light-emitting driving device can comprise a comparator configured to be connected to the sensing circuit; and an AND gate element configured to be connected to the comparator and the PWM signal generation circuit.

The comparator can compare the sensed voltage of the channel terminal with a reference voltage to output an output signal, and the AND gate element can control the supply of the PWM signal to the first switching element and the second switching element based on the output signal.

According to another aspect of the embodiment to achieve the above or other objects, a backlight apparatus, comprising: a backlight substrate comprising a plurality of light-emitting strings connected to a plurality of channel terminals, each the plurality of light-emitting strings comprising a plurality of semiconductor light-emitting elements; and a plurality of light-emitting driving circuits configured to be connected to the plurality of channel terminals to drive the plurality of light-emitting strings, wherein each of the plurality of light-emitting driving circuits comprises; a driving current generation circuit configured to generate a driving current supplied to the channel terminal; a sensing circuit configured to be connected to the channel terminal and configured to sense a voltage of the channel terminal; a PWM signal generation circuit configured to generate a PWM signal that controls supply of the driving current; and a controller configured to be connected to the sensing circuit and configured to control at least one or more of an intensity of the driving current and a duty ratio of the PWM signal based on the sensed voltage of the channel terminal.

The effects of the light-emitting driving device and the backlight apparatus according to the embodiment will be described as follows.

According to at least one of the embodiments, when the headroom voltage of the channel terminal is large, the intensity of the driving current can be increased. Accordingly, as the forward voltage of the light-emitting string increases, the headroom voltage of the channel terminal can be reduced. By reducing the headroom voltage, heat generation in the light-emitting driving device can be prevented, thereby improving product reliability.

According to at least one of the embodiments, the luminance increased by an increase in the intensity of the driving current is offset by a decrease in the duty ratio of the PWM signal, so that the original luminance can be maintained. Therefore, accurate grayscale expression can be possible.

According to at least one of the embodiments, the intensity of the driving current supplied to the plurality of channel terminals connected to the plurality of light-emitting strings, respectively can be adjusted so that the voltage of each channel terminal can be reduced to near the minimum headroom voltage. Accordingly, the headroom voltage of each channel terminal can be consistently reduced to near the minimum headroom voltage, thereby preventing heat generation in the light-emitting driving device and improving product reliability.

According to at least one of the embodiments, power consumption can be reduced by supplying or blocking driving current in synchronization with the high level and low level of the PWM signal.

Figure 1:
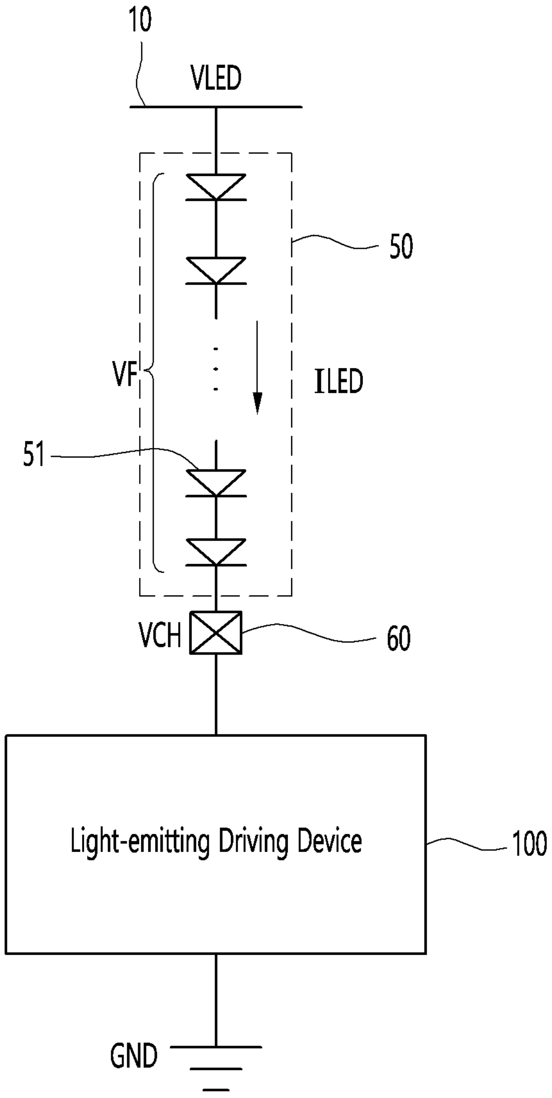
FIG. 1 is a diagram showing a light-emitting driving device connected to a light-emitting string in an embodiment.

The sizes, shapes, dimensions, etc. of components shown in the drawings can differ from actual ones. In addition, even if the same components are shown in different sizes, shapes, dimensions, etc. between the drawings, this is only an example on the drawing, and the same components have the same sizes, shapes, dimensions, etc. between the drawings.

DETAILED DESCRIPTION OF EMBODIMENTS

Hereinafter, the embodiment disclosed in this specification will be described in detail with reference to the accompanying drawings, but the same or similar components are given the same reference numerals regardless of reference numerals, and redundant descriptions thereof will be omitted. The suffixes ‘module’ and ‘unit’ for the components used in the following descriptions are given or used interchangeably in consideration of ease of writing the specification, and do not themselves have a meaning or role that is distinct from each other. In addition, the accompanying drawings are for easy understanding of the embodiment disclosed in this specification, and the technical idea disclosed in this specification is not limited by the accompanying drawings. Also, when a component such as a layer, region or substrate is referred to as being ‘on’ another component, this means that there can be directly on the other component or be other intermediate components therebetween.

FIG. 1 is a diagram showing a light-emitting driving device connected to a light-emitting string in an embodiment.

As shown in FIG. 1, A light-emitting string 50 and a light-emitting driving device 100 can be electrically connected through a channel terminal 60. That is, one terminal of the light-emitting string 50 can be electrically connected to the line to which the power supply voltage VLED is supplied, that is, the power supply line 10, and the other terminal of the light-emitting string 50 can be connected to one terminal of the light-emitting driving device 100. The other terminal of the light-emitting driving device 100 can be grounded. The other terminal of the light-emitting string 50 can be the channel terminal 60.

In the drawing, one light-emitting string 50 is connected to the light-emitting driving device 100, but a plurality of light-emitting strings 50 can be connected to the light-emitting driving device 100. Each of the plurality of light-emitting strings 50 can be referred to as a channel. The channel terminal 60 can be a terminal for connecting each channel, that is, the light-emitting string 50, to the light-emitting driving device 100.

The light-emitting driving device 100 can supply a driving current ILED to the light-emitting string 50. Accordingly, the driving current ILED can flow between the power supply line 10 and the ground, and the light-emitting string 50 can emit light by the driving current ILED.

The light-emitting string 50 can comprise a plurality of semiconductor light-emitting elements 51 connected to each other in series. The semiconductor light-emitting element 51 can comprise a light-emitting diode LED.

In order for the plurality of semiconductor light-emitting elements 51 to emit light, a forward voltage VF is required so that the driving current ILED flows from the anode terminal to the cathode terminal of each of the plurality of semiconductor light-emitting elements 51. The forward voltage VF can be determined as the difference between the power supply voltage VLED and the voltage of the channel terminal 60, that is, the headroom voltage VCH. Hereinafter, reference numeral VCH can indicate the voltage or headroom voltage of the channel terminal 60.

The forward voltage VF can vary depending on the manufacturing characteristics, threshold voltage, etc. of each of the plurality of semiconductor light-emitting elements 51, and as the forward voltage VF changes, the headroom voltage VCH can also vary. For example, when the power supply voltage VLED is fixed, as the forward voltage VF increases, the headroom voltage VCH can decrease, and as the forward voltage VF decreases, the headroom voltage VCH can increase. In this way, when the headroom voltage VCH is different for each channel, there is a problem in that the reliability of the product is reduced because it is difficult to manage the light emitting strings 50 corresponding to each channel.

Since the manufacturing characteristics, threshold voltage, voltage VCH of the channel terminal 60 of each of the plurality of semiconductor light-emitting elements 51 of the plurality of light-emitting strings 50, etc. are different, the forward voltage VF of each of the plurality of light emitting strings 50 can vary. That is, the forward voltage VF can be distributed in various ways for the plurality of light emitting strings 50. Accordingly, the headroom voltage VCH of each of the plurality of channel terminals 60 connected to the plurality of light-emitting strings 50 can also be distributed in various ways. In this instance, the voltages VCH of the channel terminals 60 connected to some of the light-emitting strings 50, that is, the headroom voltages VCH, are high, and the light-emitting driving devices 100 generate heat due to the high headroom voltages VCH. Therefore, there is a problem in that various circuit characteristics within the light-emitting driving device 100 are changed. In addition, since the plurality of light-emitting strings 50 emit light by current driving, there is a problem of high power consumption.

Various embodiments to solve the above-mentioned problem will be described below.

Figure 2:
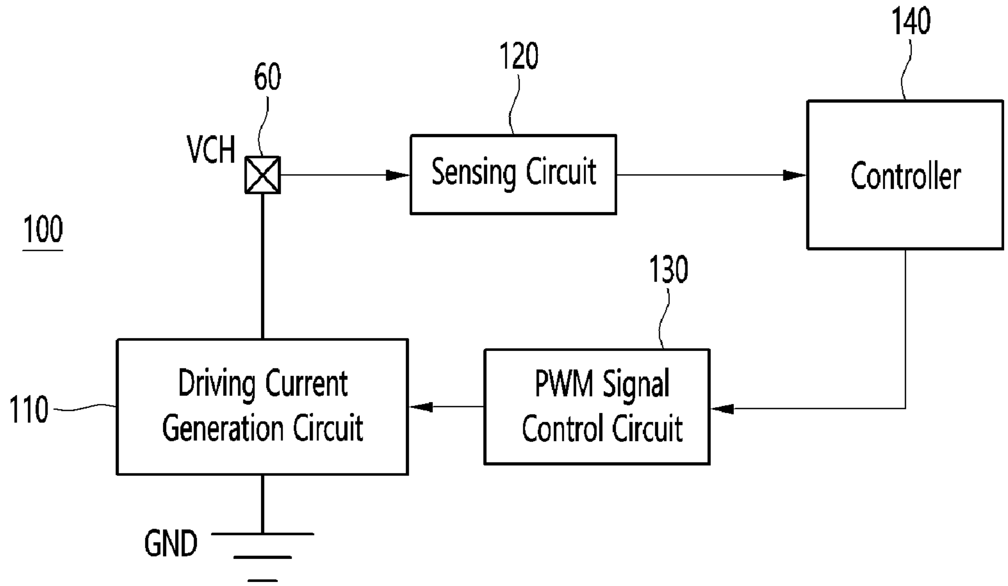
FIG. 2 is a block diagram showing a light-emitting driving device according to an embodiment.

FIG. 2 is a block diagram showing a light-emitting driving device according to an embodiment.

Referring to FIGS. 1 and 2, the light-emitting driving device 100 according to the embodiment can comprise a driving current generation circuit 110, a sensing circuit 120, a PWM signal control circuit 130, a controller 140, etc.

The driving current generation circuit 110 can generate a driving current ILED. The driving current generation circuit 110 can supply the driving current ILED to the channel terminal 60. Accordingly, the driving current ILED can flow between the power supply line 10 and the ground, so that the plurality of semiconductor light-emitting elements 51 in the light-emitting string 50 can emit light.

The sensing circuit 120 can be connected to the channel terminal 60 to sense the voltage VCH of the channel terminal 60, that is, the headroom voltage VCH. Hereinafter, the voltage VCH of the channel terminal 60 and the headroom voltage can be used interchangeably.

As shown in FIG. 6, headroom voltage coverage can be set. If the voltage VCH of the channel terminal 60 is less than the lower limit of the headroom voltage coverage, that is, the minimum headroom voltage Min VHR, the circuit may not operate normally.

Due to differences in the forward voltages VF of the plurality of light-emitting strings 50 connected to the plurality of channel terminals 60, the voltage VCH of each of the plurality of channel terminals 60 can be located within the headroom voltage coverage with a predetermined deviation. Meanwhile, when the voltage VCH of the channel terminal 60 is located at or near the upper limit of the headroom voltage coverage, heat can be generated in the light-emitting driving device 100. There is a problem in that various circuit characteristics within the light-emitting driving device 100 are changed due to such heat generation.

According to an embodiment, in order to solve the above-described problem, the headroom voltage VCH can be lowered, but the lowered headroom voltage VCH can be greater than the minimum headroom voltage Min VHR.

The controller 140 can be connected to the sensing circuit 120 to control at least one or more of the intensity of the driving current ILED and the duty ratio of the PWM signal PWM based on the sensed voltage VCH of the channel terminal 60.

The driving current ILED can be generated in the driving current generation circuit 110, and the intensity of the driving current ILED can be adjusted under the control of the controller 140. The PWM signal PWM can be generated in the PWM signal control circuit 130.

The driving current ILED flowing through the light-emitting string 50 can be controlled on/off according to the PWM signal PWM. For example, the PWM signal PWM can be a pulse that periodically has a high level (or on) and a low level (or off). For example, during the high-level section of the PWM signal PWM, the driving current ILED supplied from the driving current generation circuit 110 can flow through the light-emitting string 50. For example, during the low-level section of the PWM signal PWM, the driving current ILED may not flow in the light-emitting string 50.

Meanwhile, the duty ratio of the PWM signal PWM can be defined as the ratio of the high-level section in one cycle. Accordingly, the larger the high-level section, the larger the duty ratio can be, and the smaller the high-level section, the smaller the duty ratio can be. Under the control of the controller 140, the PWM signal control circuit 130 can adjust the duty ratio of the PWM signal PWM.

The PWM signal control circuit 130 can block the supply of the PWM signal PWM based on the voltage sensed by the sensing circuit 120, that is, the voltage VCH of the channel terminal 60, so that an operation of the sensing circuit 120 can be stopped, but it is not limited thereto.

Figure 3:
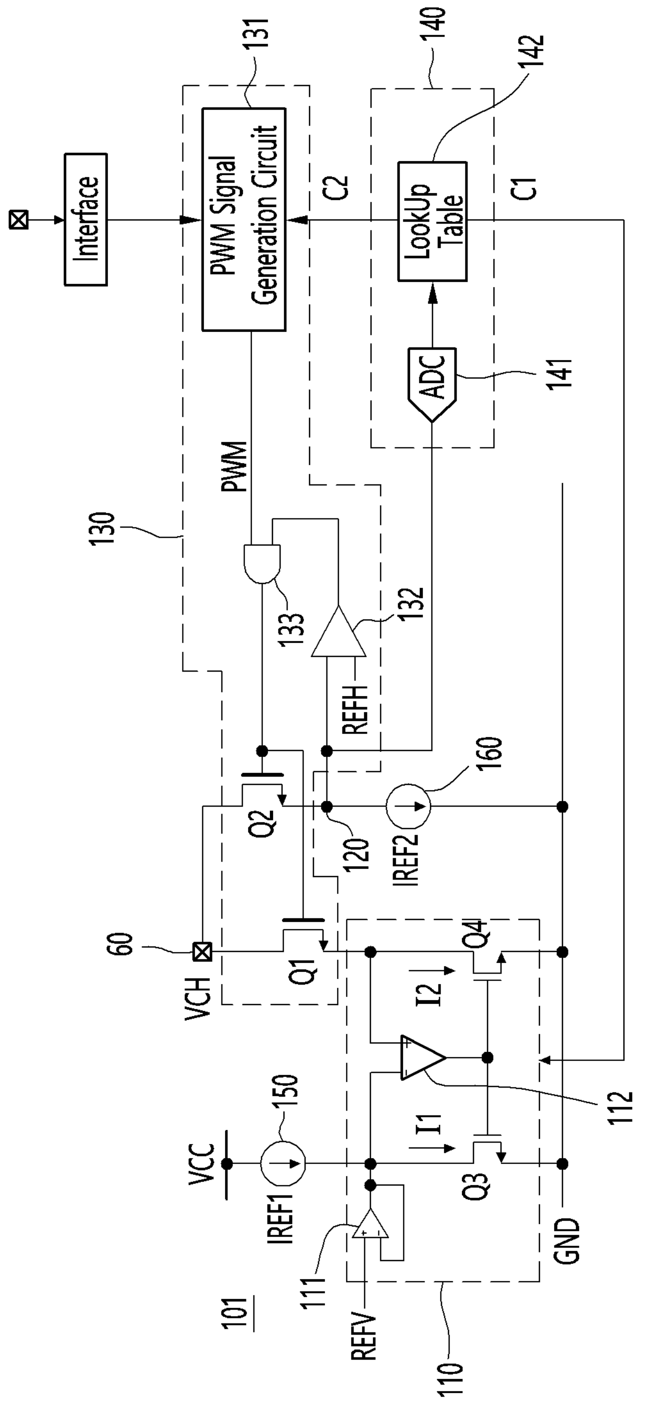
FIG. 3 is a circuit diagram showing a light-emitting driving device according to a first embodiment.

FIG. 3 is a circuit diagram showing a light-emitting driving device according to a first embodiment.

Referring to FIGS. 1 to 3, the light-emitting driving device 101 according to the first embodiment can comprise a driving current generation circuit 110, a sensing circuit 120, a PWM signal control circuit 130, and a controller 140, etc.

The driving current generation circuit 110 can comprise a mirror circuit Q3 and Q4. The first reference current IREF1 generated in a first current source 150 by the mirror circuit Q3 and Q4 can be generated as a mirror current I1, and the mirror current I1 can be copied to a mirrored current I2. The mirrored current I2 can be supplied to the channel terminal 60 as a driving current ILED.

The driving current generation circuit 110 can comprise a voltage follower 111. The voltage follower 111 can supply a reference voltage REFV to a drain terminal of a third switching element Q3 of the mirror circuit Q3 and Q4 without loss. The mirror current I1 generated in the third switching element Q3 can be determined according to the reference voltage REFV. When the reference voltage REFV increases, the mirror current I1 of the third switching element Q3 can also increase, so the driving current ILED can also increase due to the mirrored current I2.

In an embodiment, since the reference voltage REFV input to the voltage follower 111 is changed under the control of the controller 140, the driving current ILED can also be changed.

The driving current generation circuit 110 can comprise a current DAC 112. A mirror circuit can be formed by the third switching element Q3 and a fourth switching element Q4.

The current DAC 112 can be adjusted that the drain terminal of the third switching element Q3, the drain terminal of the fourth switching element Q4, and the gate terminals of the third switching element Q3 and the fourth switching element Q4 can be maintained at the same voltage.

The PWM signal control circuit 130 can comprise a PWM signal generation circuit 131. The PWM signal generation circuit 131 can generate a PWM signal PWM. The PWM signal generation circuit 131 can generate a PWM signal PWM based on the PMW control signal and/or PWM-related information input through the interface.

The PWM signal generation circuit 131 can adjust the duty ratio of the PWM signal PWM under the control of the controller 140. That is, the duty ratio of the PWM signal PWM can be varied.

The PWM signal control circuit 130 can comprise a comparator 132. The comparator 132 can be connected to the sensing circuit 120. The voltage sensed from the sensing circuit 120, that is, the voltage VCH of the channel terminal 60, can be input to the comparator 132. The comparator 132 can output an output signal based on the voltage VCH of the channel terminal 60. The output signal can be high level, such as '1', or low level, such as '0'. The comparator 132 can compare the voltage VCH of the channel terminal 60 with the reference voltage REFH and output an output signal according to the comparison result. For example, when the voltage VCH of the channel terminal 60 exceeds the reference voltage REFH, the comparator 132 can output '1' as an output signal. For example, when the voltage VCH of the channel terminal 60 is less than or equal to the reference voltage REFH, the comparator 132 can output '0' as an output signal.

The reference voltage REFH can be a voltage similar to the minimum headroom voltage Min VHR. For example, the reference voltage REFH can be a value greater than the minimum headroom voltage Min VHR and can be set to a value greater than the minimum headroom voltage Min VHR in a range of 3% to 10%. For example, when the minimum headroom voltage Min VHR is 550 mV, the reference voltage REFH can be set within the range of 565 mV to 605 mV.

PWM signal control circuit 130 can comprise an AND gate element 133. The AND gate element 133 can be connected to the comparator 132 and the PWM signal generation circuit 131.

The output signal of the comparator 132 and the PWM signal PWM of the PWM signal generation circuit 131 can be input to the AND gate element 133. The AND gate element 133 can perform an OR operation on the output signal and the PWM signal PWM to output an output signal. The output signal can be high level, such as '1', or low level, such as '0'.

When the low-level output signal of the comparator 132 is input, the AND gate element 133 can output a low-level output signal regardless of the PWM signal PWM. When the high-level output signal of the comparator 132 is input, the AND gate element 133 can output the PWM signal PWM as an output signal as it is.

The PWM signal control circuit 130 can comprise a first switching element Q1 and a second switching element Q2.

The first switching element Q1 can comprise a gate terminal connected to the AND gate element 133, a drain terminal connected to the channel terminal 60, and a source terminal connected to the driving current generation circuit 110. The second switching element Q2 can comprise a gate terminal connected to the AND gate element 133, a drain terminal connected to the channel terminal 60, and a source terminal connected to a second current source 160. The second current source 160 can supply the second reference current IREF2 to the channel terminal 60, but the second current source 160 can be omitted.

The AND gate element 133 can be commonly connected to the gate terminal of the first switching element Q1 and the gate terminal of the second switching element Q2, but it is not limited thereto. Accordingly, the first switching element Q1 and the second switching element Q2 can be controlled on/off according to the output signal of the AND gate element 133. For example, the first switching element Q1 and the second switching element Q2 can be turned on in response to a high-level output signal output from the AND gate element 133. For example, the first switching element Q1 and the second switching element Q2 can be turned off in response to the low-level output signal output from the AND gate element 133.

The sensing circuit 120 can be connected to the source terminal of the second switching element Q2. Accordingly, the sensing circuit 120 can or may not sense the voltage VCH of the channel terminal 60 according to the on/off control of the second switching element Q2. For example, when the second switching element Q2 is turned on, the voltage VCH of the channel terminal 60 can be input to the sensing circuit 120 via the second switching element Q2. For example, when the second switching element Q2 is turned off, the voltage VCH of the channel terminal 60 can be blocked by the second switching element Q2, so the voltage VCH of the channel terminal 60 may not be input to the sensing circuit 120. In other words, the sensing circuit 120 can sense the voltage VCH of the channel terminal 60 when the second switching element Q2 is turned on, and may not sense the voltage VCH of the channel terminal 60 when the second switching element Q2 is turned off.

When the voltage VCH of the channel terminal 60 sensed by the sensing circuit 120 is greater than the reference voltage REFH, the PWM signal PWM of the PWM signal generation circuit 131 can supplied to the first switching element Q1 and the second switching element Q2 through the AND gate element 133 by the high level output signal from the comparator 132 and can be used to control on/off the first switching element Q1 and the second switching element Q2.

When the voltage VCH of the channel terminal 60 sensed by the sensing circuit 120 is less than or equal to the reference voltage REFH, due to the low level output signal output from the comparator 132, the PWM signal PWM of the PWM signal generation circuit 131 can be blocked by the AND gate element 133. In this instance, the first switching element Q1 and the second switching element Q2 can turned off in response to the low level output signal output from the AND gate element 133.

Meanwhile, the controller 140 can comprise an analog-digital converter (ADC) 141 and a lookup table 142. The ADC 141 can convert the voltage VCH of the channel terminal 60 provided from the sensing circuit 120 into a digital code value. The lookup table 142 can be stored in memory other than the controller 140. Control signals according to digital code values can be tabulated in the lookup table 142. The control signals can comprise a first control signal C1 to be supplied to the driving current generation circuit 110 and a second control signal C2 to be supplied to the PWM signal generation circuit 131.

The first control signal C1 can comprise driving current change information. The driving current change information can comprise information about an increase in the intensity of the driving current ILED or information about the invariance of the intensity of the driving current ILED.

When the digital code value provided from the ADC 141 is less than or equal to the reference value, information regarding the invariance of the intensity of the driving current ILED can be stored in the lookup table 142 as the first control signal C1. When the digital code value exceeds the reference value, information with an increase value of the driving current ILED corresponding to the size of the digital code value can be stored in the lookup table 142 as the first control signal C1.

Figure 4A:
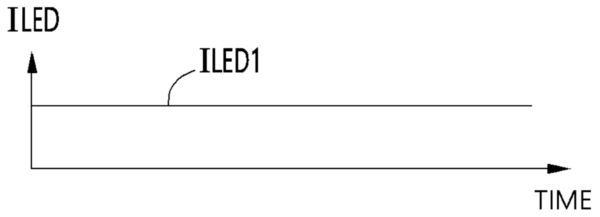
FIGS. 4A to 4F are waveform diagrams showing driving current according to various conditions.
Figure 4B:
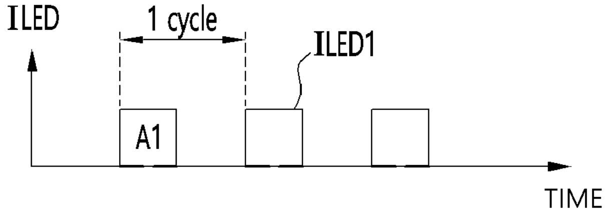

As shown in FIG. 4A, the driving current generation circuit 110 can supply the first driving current ILED1 having a constant level to the channel terminal 60. Each of the first switching element Q1 and the second switching element Q2 can be controlled on/off according to the PWM signal PWM of the PWM signal generation circuit 131, so that a first driving current ILED1 having a first pulse can flow in the light emitting string 50 connected to the channel terminal 60, as shown in FIG. 4B. The first pulse of the first driving current ILED1 can periodically have a high level and a low level. The width of the high level of the first driving current ILED1 can be equal to the width of the high level of the first PWM signal PWM, and the width of the low level of the first driving current ILED1 can be equal to the width of the low level of the first PWM signal PWM, but is not limited thereto. The luminance A1 of the light-emitting string 50 can be determined by the product of a magnitude (or amplitude) and a width of the high level of the first driving current ILED1.

Meanwhile, when the first control signal C1 comprises information regarding the invariance of the intensity of the driving current, the driving current generation circuit 110 can maintain the intensity of the first driving current ILED1 as it is.

Figure 4C:
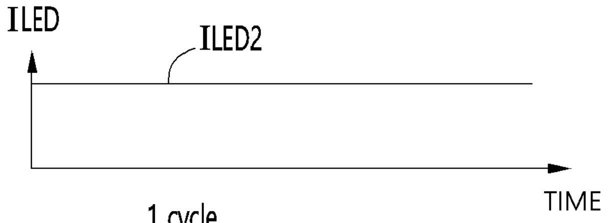
Figure 4D:
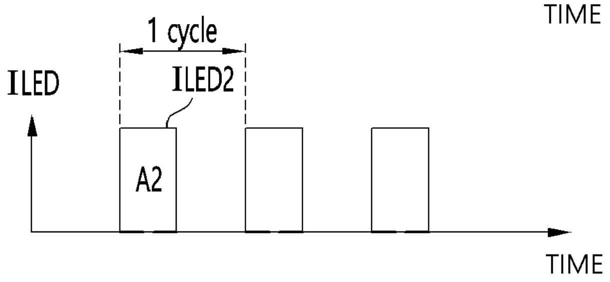

When the first control signal C1 comprises information having an increase value of the driving current, the driving current generation circuit 110 can adjust the intensity of the first driving current ILED1 based on the first control signal C1. For example, the driving current generation circuit 110 can increase the intensity of the first driving current ILED1 based on the first control signal C1. That is, as shown in FIG. 4C, the driving current generation circuit 110 can supply the second driving current ILED2, which has a value obtained by adding the increase value included in the first control signal C1 to the first driving current ILED, to the channel terminal 60. The second driving current ILED2 supplied from the driving current generation circuit 110 can also have a constant level. In this instance, as shown in FIG. 4D, the second driving current ILED2, which has a constant level by on/off control of each of the first switching element Q1 and the second switching element Q2, can be changed to the second driving current ILED2 having a second pulse. Accordingly, the second driving current ILED2 having the second pulse can flow through the light-emitting string 50 connected to the channel terminal 60.

As shown in FIGS. 4B and 4D, the width of the high level of the first driving current ILED1 and the width of the high level of the second driving current ILED2 are the same, but the magnitude (or amplitude) of the high level of the second driving current ILED2 is greater than the magnitude (or amplitude) of the high level of the first driving current ILED1, so that the luminance can vary. That is, the luminance A2 when the second drive current ILED2 flows through the light-emitting string 50 can be greater than the luminance A1 when the first drive current ILED1 flows through the light-emitting string 50. Therefore, it is necessary to maintain the same luminance by lowering the luminance A2 when the second driving current ILED2 flows to the luminance A1 when the first driving current ILED1 flows. If this is not the case, there is a problem where the image is expressed in a higher grayscale than the grayscale it is intended to express.

To this end, the controller 140 can transmit the second control signal C2 to the PWM signal generation circuit 131 using the lookup table 142. The second control signal C2 can comprise duty change information as well as a PMW control signal and/or PWM-related information. The duty change information can comprise information about a decrease in the duty ratio of the PWM signal PWM. When the digital code value exceeds the reference value, information having a decrease value in the duty ratio of the PWM signal PWM corresponding to the size of the digital code value can be stored in the lookup table 142 as the second control signal (C2).

Figure 4E:
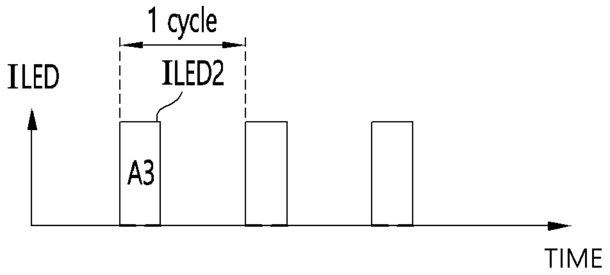

The PWM signal generation circuit 131 can adjust the duty ratio of the PWM signal PWM based on the second control signal C2. As shown in FIG. 4B, the first driving current ILED1 having a first pulse can flow in the light emitting string 50 according to the first PWM signal PWM, which has a first duty ratio output from the PWM signal generation circuit 131. When the second control signal C2 is provided from the controller 140, the PWM signal generation circuit 131 can change the first PWM signal PWM having a first duty ratio into a second PWM signal PWM having a second duty ratio based on the decrease value of the duty ratio of the PWM signal PWM included in the second control signal C2. As shown in FIG. 4E, the second driving current ILED2 having a second pulse corresponding to the second duty ratio can flow through the light emitting string 50 by controlling the first switching element Q1 and the second switching element Q2 on/off according to the second PWM signal PWM having a second duty ratio. As shown in FIGS. 4B, 4D, and 4E, as the amplitude increases from the first driving current ILED1 to the second driving current ILED2, the width of the high level of the second driving current ILED2 becomes smaller than the width of the high level of the first driving current ILED1, so that luminance can be maintained without change as it is. That is, the luminance A3 of the light-emitting string 50 caused by the second driving current ILED2 shown in FIG. 4E can be the same as the luminance A1 of the light-emitting string 50 caused by the first driving current ILED1 shown in FIG. 4B.

According to the embodiment, the controller 140 can control the driving current generation circuit 110 based on the voltage VCH of the channel terminal 60 sensed by the sensing circuit 120 to increase the intensity of the driving current ILED (FIGS. 4A and 4C). Accordingly, the first driving current ILED1 can be increased to the second driving current ILED2. As the forward voltage VF of the light emitting string 50 increases due to the increased intensity of the driving current ILED, the voltage VCH of the channel terminal 60, that is, the headroom voltage VCH, can be reduced. By reducing the headroom voltage VCH, heat generation of the light-emitting driving device 100 can be prevented, thereby improving product reliability.

Meanwhile, the PWM signal control circuit 130 can control the supply of the PWM signal PWM based on the voltage VCH of the channel terminal 60 sensed by the sensing circuit 120. For example, when the voltage VCH of the channel terminal 60 is greater than the reference voltage REFH, the comparator 132 can output a high-level output signal to the AND gate element 133, and the AND gate element 133 can supply, as it is, the PWM signal PWM of the PWM signal generation circuit 131 to the first switching element Q1 and the second switching element Q2 according to the high level output signal. The driving current ILED with increased intensity can be converted into a driving current ILED with a pulse by controlling the first switching element Q1 and the second switching element Q2 on/off by the PWM signal PWM (FIG. 4D).

Meanwhile, as the intensity of the driving current ILED increases, the luminance of the light-emitting string 50 can increase. According to the embodiment, the controller 140 can control the PWM signal generation circuit 131 based on the voltage VCH of the channel terminal 60 sensed by the sensing circuit 120 to reduce the duty ratio of the PWM signal PWM.

Accordingly, the first switching element Q1 and the second switching element Q2 can be controlled on/off by the PWM signal PWM with the reduced duty ratio, so that the driving current ILED having a pulse with increased intensity but reduced width can be supplied to the channel terminal 60 (FIG. 4E). Accordingly, as the intensity of the driving current ILED increases, the increased luminance A3 can be compensated by a decrease in the supply time of the driving current ILED, that is, a decrease in the on section, so that an increase in luminance can be prevented. That is, the increased luminance (A2 in FIG. 4D) due to an increase in the intensity of the driving current ILED can be offset by a decrease in the duty ratio of the PWM signal PWM, so that the original luminance (A1 in FIG. 4B) can be maintained.

Meanwhile, the sensing circuit 120 can continue to sense the decrease in the voltage VCH of the channel terminal 60, and the controller 140 can control the intensity of the driving current ILED to continue to increase and the PWM signal and to decrease the duty ratio of PWM signal PWM.

Figure 4F:

When the voltage VCH of the channel terminal 60 sensed by the sensing circuit 120 is identical to the reference voltage REFH or is smaller than the reference voltage REFH, the controller 140 can control the driving current generation circuit 110 to block the generation of the driving current ILED or the supply of the generated driving current ILED. In this instance, the third driving current ILED3 flowing through the light-emitting string 50 can be close to 0 (FIG. 4F). Alternatively, the third driving current ILED3 can be 0.

When the voltage VCH of the channel terminal 60 sensed by the sensing circuit 120 is identical to the reference voltage REFH or is smaller than the reference voltage REFH, a low-level output signal from the comparator 132 can be input to the AND gate element 133, and the AND gate element 133 can block the supply of the PWM signal PWM with the reduced duty ratio to the first switching element Q1 and the second switching element Q2 according to the low-level output signal. Accordingly, the first switching element Q1 and the second switching element Q2 can be turned off, so that the driving current ILED can weakly flow or not flow in the light emission stream. The voltage VCH of the channel terminal 60, that is, the headroom voltage VCH, can be reduced to a voltage close to the reference voltage REFH, that is, the minimum headroom voltage Min VHR, so that there is no longer a need to reduce the headroom voltage VCH and there is no need to sense the voltage VCH of the channel terminal 60.

Meanwhile, the input voltage REFV supplied to the voltage follower 111 can be fixed so that the driving current ILED with increased intensity can be generated. In addition, the PWM signal generation circuit 131 can be set to generate a PWM signal PWM with a reduced duty ratio. Although not shown, the set PWM signal PWM can be supplied to the first switching element Q1 through a separate path to control the first switching element Q1 on/off. The set PWM signal PWM can be supplied to not only the first switching element Q1 but also the second switching element Q2 through a separate path.

Although not shown, the above-described driving operation can be adopted as it is for a plurality of light-emitting strings 50 each connected to a plurality of light-emitting driving device 101 according to the first embodiment. Accordingly, when the voltage VCH of the channel terminal 60 connected to each of the plurality of light-emitting strings 50 is greater than the reference voltage REFH, the intensity of the driving current ILED supplied to the corresponding light emitting string 50 can be increased and the duty ratio of the PWM signal PWM that controls the on/off driving current ILED can be decreased, so that with the luminance maintained constant, the voltage VCH of the channel terminal 60, that is, the headroom voltage VCH, can be reduced to near the minimum headroom voltage Min VHR. Accordingly, the headroom voltage VCH of each channel terminal 60 can be consistently reduced near the minimum headroom voltage Min VHR, thereby preventing heat generation in the light-emitting driving device 100 and improving product reliability.

Figure 5A:
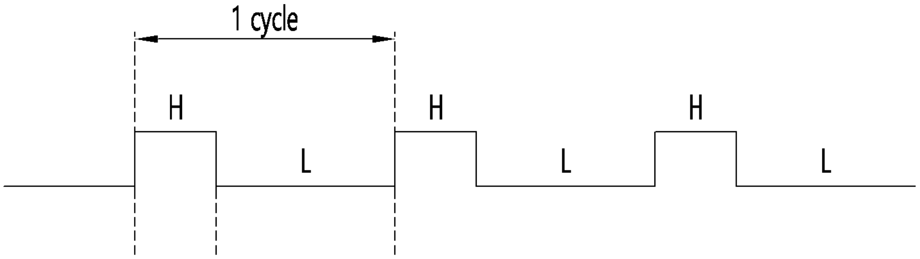
FIG. 5A shows a PWM signal PWM.
Figure 5B:
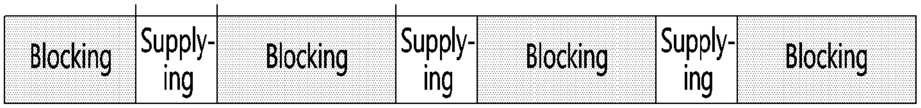
FIG. 5B shows a driving current being supplied/blocked in synchronization with the PWM signal PWM.

Meanwhile, according to the embodiment, the controller 140 can supply or block the driving current ILED by controlling the driving current generation circuit 110 to be synchronized with the high level and low level of the PWM signal PWM. As shown in FIG. 5A, the PWM signal PWM can be a pulse that periodically has a high level H and a low level L. The controller 140 can control the driving current generation circuit 110 to be synchronized with the high level H and low level L of the PWM signal PWM. As shown in FIG. 5B, during the high-level section of the PWM signal PWM, the controller 140 can control the driving current generation circuit 110 to supply the driving current ILED to the channel terminal 60. During the low-level section of the PWM signal PWM, the controller 140 can control the driving current generation circuit 110 to not generate the driving current ILED or to not supply the generated driving current ILED to the channel terminal 60. As it is periodically synchronized with the PWM signal PWM having a high level H and a low level L, the driving current ILED can be supplied or blocked. Accordingly, by periodically blocking the driving current ILED, power consumption can be reduced.

Figure 6A:
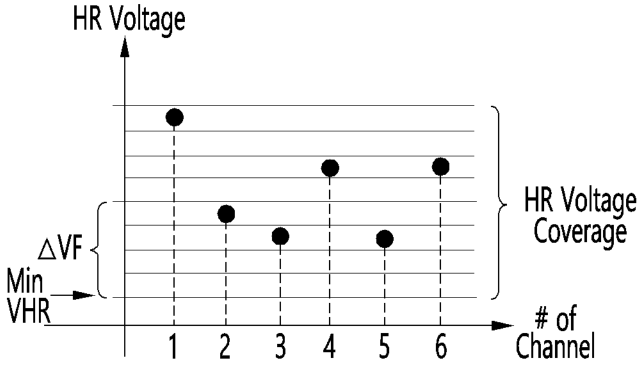
FIG. 6A shows a distribution of headroom voltages formed at channel terminals of a plurality of light-emitting strings according to a comparative example.
Figure 6B:
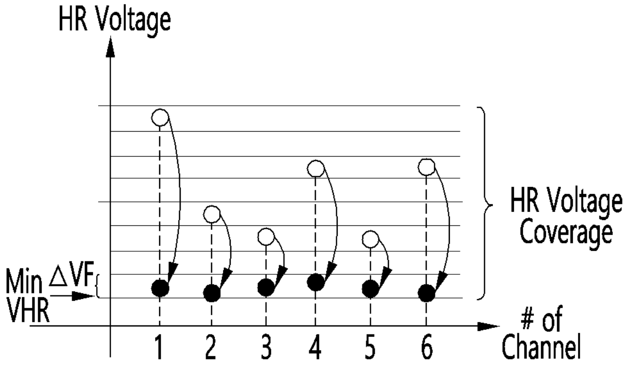
FIG. 6B shows a distribution of headroom voltages formed at channel terminals of a plurality of light-emitting strings according to an embodiment.

FIG. 6A shows a distribution of headroom voltages formed at channel terminals of a plurality of light-emitting strings according to a comparative example and FIG. 6B shows a distribution of headroom voltages formed at channel terminals of a plurality of light-emitting strings according to an embodiment.

As shown in FIG. 6A, in the comparative example, the voltage VCH of the channel terminal 60, that is, the headroom voltage VCH, is not only distributed in various ways for a plurality of channel terminals 60, but also the headroom voltages VCH of some channel terminals 60 can be high, so that driving the light emission can generate heat.

However, as shown in FIG. 6B, in the embodiment, the headroom voltages VCH variously distributed for the plurality of channel terminals 60 can be uniformly reduced to, for example, a voltage near the minimum headroom voltage Min VHR, heat generation of the light emission driving device 100 can be prevented. In addition, since the headroom voltage VCH of each of the plurality of channel terminals 60 is managed consistently, product reliability can be improved.

Figure 7:
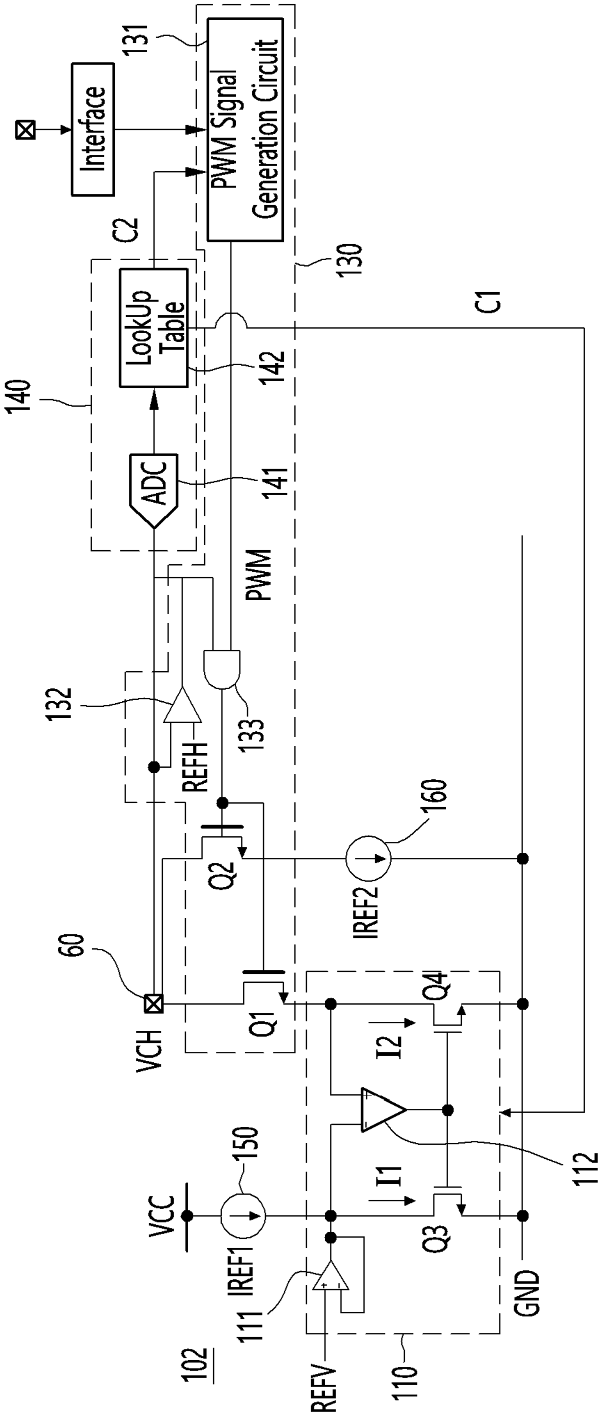
FIG. 7 is a circuit diagram showing a light-emitting driving device according to a second embodiment.

FIG. 7 is a circuit diagram showing a light-emitting driving device according to a second embodiment.

The second embodiment is the same as the first embodiment except for the connection position of the sensing circuit 120. In the second embodiment, components having the same structure, shape, and/or function as those of the first embodiment are given the same reference numerals and detailed descriptions are omitted.

Referring to FIGS. 1, 2, and 7, the light-emitting driving device 102 according to the second embodiment can comprise a driving current generation circuit 110, a sensing circuit 120, a PWM signal control circuit 130, and a controller 140.

The PWM signal control circuit 130 can comprise a PWM signal generation circuit 131, a first switching element Q1, a second switching element Q2, a comparator 132, an AND gate element 133, etc.

The sensing circuit 120 of the first embodiment (FIG. 3) can be electrically connected to the channel terminal 60 via the second switching element Q2. In contrast, the sensing circuit 120 of the second embodiment (FIG. 7) can be directly electrically connected to the channel terminal 60. Therefore, since the sensing circuit 120 of the second embodiment (FIG. 7) does not go through the second switching element Q2, sensing accuracy can be improved by directly sensing the voltage VCH of the channel terminal 60 without being affected by noise. In addition, the controller 140 of the second embodiment (FIG. 7) can be directly electrically connected to the channel terminal 60. Therefore, since the voltage VCH of the channel terminal 60 is directly input to the controller 140 without being affected by noise, the controller 140 can generate a first control signal C1 and/or a second control signal C2 corresponding to the voltage VCH of the corresponding channel terminal 60. That is, since the voltage VCH of the channel terminal 60 is accurately obtained, the voltage VCH of the channel terminal 60, that is, the headroom voltage VCH, can be reduced to a value near the minimum headroom voltage Min VHR, that is, the reference voltage REFH according to the first control signal C1 and/or the second control signal C2 corresponding to the voltage VCH of the channel terminal 60. Accordingly, it is possible to accurately level down the headroom voltage VCH, thereby improving product reliability.

Figure 8:
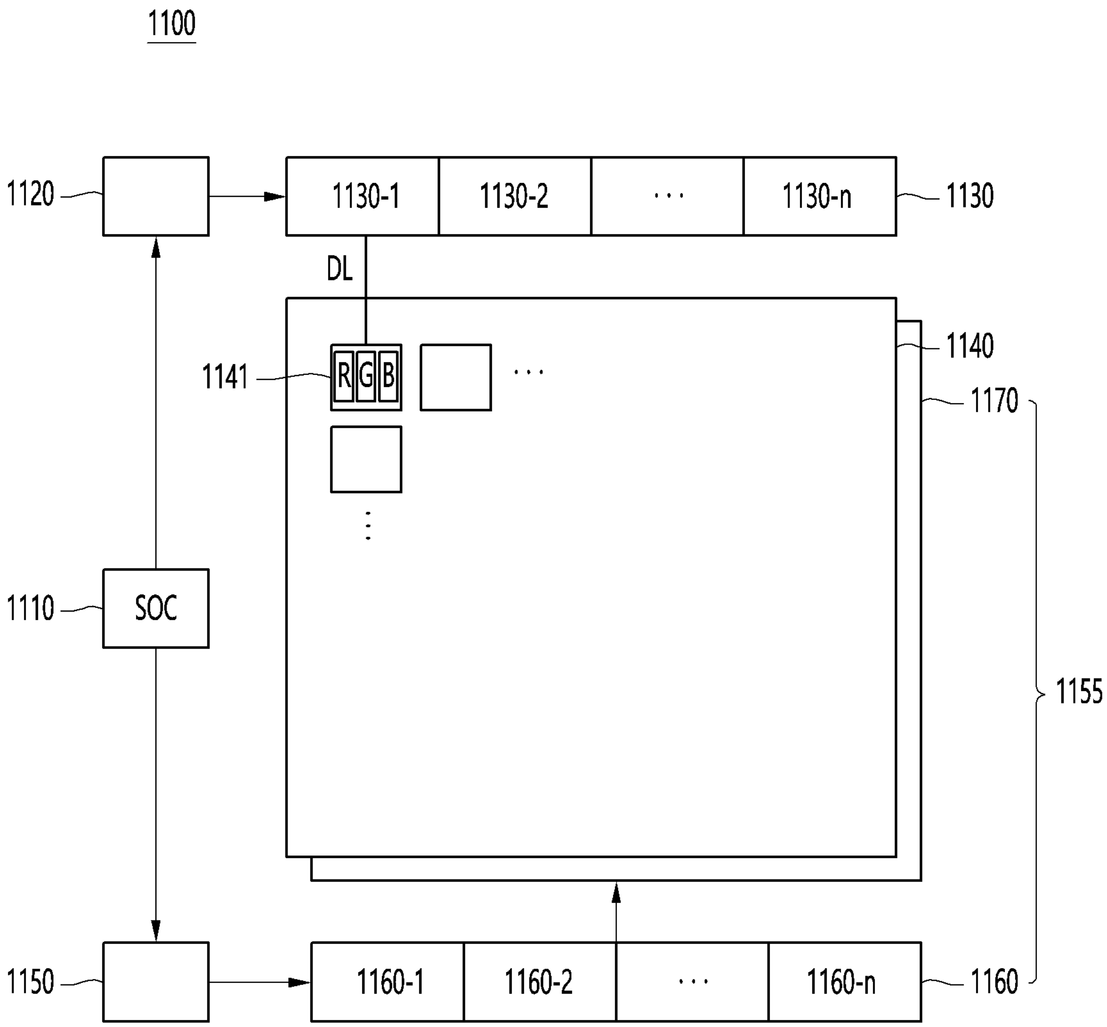
FIG. 8 is a configuration diagram of a display device according to an embodiment.

FIG. 8 is a configuration diagram of a display device according to an embodiment.

Referring to FIG. 8, the display device 1100 can comprise a system on chip (SOC) 1110, a timing controller 1120, a data driving circuit 1130, a display panel 1140, and a microcontroller unit 1150, a light-emitting driving circuit 1160, a backlight substrate 1170, etc. The microcontroller unit 1150 can be referred to as a first controller, and the timing controller 1120 can be referred to as a second controller. A backlight apparatus can be configured by the light-emitting driving circuit 1160 and the backlight substrate 1170.

The system-on-chip 1110 can be a circuit that performs the function of a central processing unit (CPU), such as an application processor (AP).

The timing controller 1120 can be a circuit that controls the operation timing of the data driving circuit 1130, the light-emitting driving circuit 1160, etc. The timing controller 1120 can control the data driving circuit 1130 to convert externally input image data into a data voltage corresponding to the grayscale value of the pixel of the display panel 1140.

The data driving circuit 1130 can comprise a plurality of data driving circuits 1130-1 to 1130-*n*.

The display panel 1140 can be OLED, LCD, etc., but can have a structure capable of receiving light through the backlight substrate 1170.

The microcontroller unit 1150 can be a device that transmits a control signal to the light-emitting driving circuit 1160 to control the driving timing, the driving current ILED, the driving voltage, etc. of the light-emitting element. The timing controller 1120 and the microcontroller unit 1150 can share some functions and, if necessary, can be implemented in an integrated form for effective data operation, but are not limited thereto.

The light-emitting driving circuit 1160 can be a device for controlling the operation of a plurality of light-emitting elements disposed on the backlight substrate 1170. The light-emitting driving circuit 1160 can control the operation of a switch circuit (not shown) disposed therein, and can control the timing or intensity of the driving current ILED supplied to the light-emitting elements. The light-emitting driving circuit 1160 can change the operation of the light-emitting elements based on a control signal received from the microcontroller unit 1150 or can change the operation of the light-emitting elements based on a signal received from another light-emitting driving circuit. If necessary, the light-emitting driving circuit 1160 can change the operation of the light-emitting elements based on an algorithm or information previously stored by an internal register (not shown).

The light-emitting driving circuit 1160 can comprise a plurality of light-emitting driving circuits 1160-1 to 1160-*n*. The plurality of light-emitting driving circuits 1160-1 to 1160-*n* can each be connected to a plurality of light-emitting strings (not shown), so that the plurality of light-emitting strings can emit light simultaneously or individually. One of the plurality of light-emitting driving circuits 1160-1 to 1160-*n* can be the light-emitting driving device 100, 101, and 102 shown in FIGS. 1 to 3 and 7.

The backlight substrate 1170 can comprise a plurality of light-emitting strings 50 connected to a plurality of light-emitting driving circuits 1160-1 to 1160-*n*. For example, the plurality of light-emitting strings 50 can be connected to one light-emitting driving circuit. The light-emitting string 50 can comprise a plurality of semiconductor light-emitting elements 51. One light-emitting driving circuit can control a plurality of channels corresponding to the plurality of light-emitting strings 50 individually or simultaneously.

The above detailed description should not be construed as restrictive in any respect and should be considered illustrative. The scope of the embodiments should be determined by reasonable interpretation of the appended claims, and all changes within the equivalent scope of the embodiments are included in the scope of the embodiments.

What is claimed is:

1. A light-emitting driving device, comprising:

a driving current generation circuit configured to be connected to a channel terminal of a light-emitting string comprising a plurality of semiconductor light-emitting elements to generate a driving current supplied to the channel terminal;

a sensing circuit configured to be connected to the channel terminal and configured to sense a voltage of the channel terminal;

a PWM signal generation circuit configured to generate a PWM signal that controls supply of the driving current; and a controller configured to be connected to the sensing circuit and configured to control at least one or more of an intensity of the driving current and a duty ratio of the PWM signal based on the sensed voltage of the channel terminal, wherein when the sensed voltage of the channel terminal exceeds a reference voltage, the controller is configured to control the driving current generation circuit to increase the intensity of the driving current, and wherein the reference voltage is a value greater than a minimum headroom voltage corresponding to a lower limit of a headroom voltage coverage.

2. The light-emitting driving device of claim 1, wherein the controller is configured to control the at least one or more of the intensity of the driving current and the duty ratio of the PWM signal to reduce the voltage of the channel terminal to a voltage close to the minimum headroom voltage corresponding to the lower limit of the headroom voltage coverage.

3. The light-emitting driving device of claim 1, wherein when the sensed voltage of the channel terminal exceeds the reference voltage, the controller is configured to control the PWM signal generation circuit to reduce the duty ratio of the PWM signal.

4. The light-emitting driving device of claim 1, wherein when the sensed voltage of the channel terminal is less than or equal to the reference voltage, the controller is configured to control at least one or more of the driving current generation circuit and the PWM signal generation circuit to block supply of the driving current.

5. The light-emitting driving device of claim 1, comprising:

a comparator configured to be connected to the sensing circuit; and an AND gate element configured to be connected to the comparator and the PWM signal generation circuit.

6. The light-emitting driving device of claim 5, wherein the comparator is configured to compare the sensed voltage of the channel terminal with the reference voltage to output an output signal, and the AND gate element is configured to control the supply of the PWM signal to a first switching element and a second switching element based on the output signal.

7. The light-emitting driving device of claim 1, wherein the PWM signal is a pulse signal that periodically has a high level and a low level, and the sensing circuit is configured to sense the voltage of the channel terminal during a high-level section.

8. The light-emitting driving device of claim 7, wherein the controller is configured to supply or block the driving current by controlling the driving current generation circuit to be synchronized to the high level and the low level.

9. A light-emitting driving device, comprising:

a driving current generation circuit configured to be connected to a channel terminal of a light-emitting string comprising a plurality of semiconductor light-emitting elements to generate a driving current supplied to the channel terminal;

a first switching element between the channel terminal and the driving current generation circuit;

a sensing circuit configured to be connected to the channel terminal and configured to sense a voltage of the channel terminal;

a second switching element between the channel terminal and the sensing circuit;

a PWM signal generation circuit configured to generate a PWM signal that controls on and off of the first switching element and the second switching element; and a controller configured to be connected to the sensing circuit and configured to control at least one or more of an intensity of the driving current and a duty ratio of the PWM signal based on the sensed voltage of the channel terminal.

10. The light-emitting driving device of claim 9, wherein the controller is configured to control the at least one or more of the intensity of the driving current and the duty ratio of the PWM signal to reduce the voltage of the channel terminal to a voltage close to a minimum headroom voltage corresponding to a lower limit of a headroom voltage coverage.

11. The light-emitting driving device of claim 9, comprising:

a comparator configured to be connected to the sensing circuit; and an AND gate element configured to be connected to the comparator and the PWM signal generation circuit.

12. The light-emitting driving device of claim 11, wherein the comparator is configured to compare the sensed voltage of the channel terminal with a reference voltage to output an output signal, and the AND gate element is configured to control the supply of the PWM signal to the first switching element and the second switching element based on the output signal.

13. The light-emitting driving device of claim 12, wherein the reference voltage is a value greater than a minimum headroom voltage corresponding to a lower limit of a headroom voltage coverage.

14. The light-emitting driving device of claim 12, wherein the reference voltage is a value greater than a minimum headroom voltage corresponding to a lower limit of a headroom voltage coverage within a range of 3% to 10%.

15. A backlight apparatus, comprising:

a backlight substrate comprising a plurality of light-emitting strings connected to a plurality of channel terminals, each the plurality of light-emitting strings comprising a plurality of semiconductor light-emitting elements; and a plurality of light-emitting driving circuits configured to be connected to the plurality of channel terminals to drive the plurality of light-emitting strings, wherein each of the plurality of light-emitting driving circuits comprises:

a driving current generation circuit configured to generate a driving current supplied to the channel terminal;

a sensing circuit configured to be connected to the channel terminal and configured to sense a voltage of the channel terminal;

a PWM signal generation circuit configured to generate a PWM signal that controls supply of the driving current; and a controller configured to be connected to the sensing circuit and configured to control at least one or more of an intensity of the driving current and a duty ratio of the PWM signal based on the sensed voltage of the channel terminal, wherein when the sensed voltage of the channel terminal exceeds a reference voltage, the controller is configured to control the driving current generation circuit to increase the intensity of the driving current, and wherein the reference voltage is a value greater than a minimum headroom voltage corresponding to a lower limit of a headroom voltage coverage.

16. The backlight apparatus of claim 15, wherein the plurality of light-emitting driving circuits are configured to reduce voltages of the plurality of channel terminals each connected to the plurality of light-emitting driving circuits to a voltage close to the minimum headroom voltage corresponding to the lower limit of the headroom voltage coverage.

17. The backlight apparatus of claim 15, wherein when the sensed voltage of the channel terminal exceeds the reference voltage, the controller is configured to control the PWM signal generation circuit to reduce the duty ratio of the PWM signal.

18. The backlight apparatus of claim 15, wherein when the sensed voltage of the channel terminal is less than or equal to the reference voltage, the controller is configured to control at least one or more of the driving current generation circuit and the PWM signal generation circuit to block supply of the driving current.

* * * * *